United States Patent
Hallman et al.

(10) Patent No.: US 9,548,580 B2
(45) Date of Patent: Jan. 17, 2017

(54) TERMINAL CRIMPING SYSTEM WITH WIRE ALIGNMENT AID

(71) Applicant: Tyco Electronics Corporation, Berwyn, PA (US)

(72) Inventors: Michael Edward Hallman, Harrisburg, PA (US); Mark Elton Unger, III, Tower City, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 280 days.

(21) Appl. No.: 14/286,278

(22) Filed: May 23, 2014

(65) Prior Publication Data
US 2015/0340827 A1    Nov. 26, 2015

(51) Int. Cl.
| | |
|---|---|
| H01R 43/048 | (2006.01) |
| G06T 7/00 | (2006.01) |
| H01R 43/052 | (2006.01) |
| H01R 43/28 | (2006.01) |
| H01R 43/055 | (2006.01) |

(52) U.S. Cl.
CPC .......... *H01R 43/048* (2013.01); *G06T 7/0004* (2013.01); *G06T 7/0024* (2013.01); *H01R 43/052* (2013.01); *H01R 43/28* (2013.01); *H01R 43/055* (2013.01); *Y10T 29/49187* (2015.01); *Y10T 29/53087* (2015.01)

(58) Field of Classification Search
CPC ..... G06T 7/0004; G06T 7/0024; H01R 43/048
See application file for complete search history.

(56) References Cited

U.S. PATENT DOCUMENTS

| | | | | | |
|---|---|---|---|---|---|
| 5,570,514 | A | * | 11/1996 | Hashimoto | ........ H01R 43/0488 33/555 |
| 5,697,146 | A | * | 12/1997 | Inoue | ...................... B30B 1/266 29/33 M |
| 5,937,505 | A | * | 8/1999 | Strong | ................ B30B 15/0094 29/593 |
| 6,073,471 | A | * | 6/2000 | Naka | ..................... B25B 27/146 29/715 |

(Continued)

FOREIGN PATENT DOCUMENTS

| | | |
|---|---|---|
| JP | 2005 216717 A | 8/2005 |
| JP | 2008 177031 A | 7/2008 |

(Continued)

OTHER PUBLICATIONS

International Search Report, International Application No. PCT/US2015/031872, International Filing Date, May 21, 2015.

*Primary Examiner* — Minh Trinh

(57) ABSTRACT

A terminal crimping system for a crimping machine includes an anvil, a movable ram, an image acquisition device, and a display device. The anvil is located in a crimping zone and configured to receive a terminal thereon. The terminal has a wire crimp barrel configured to receive a wire therein. The ram has crimp tooling configured to crimp the wire crimp barrel of the terminal to the wire during a crimp stroke of the ram. The image acquisition device is configured to be mounted on the crimping machine above the crimping zone. The image acquisition device is positioned to acquire an image of the wire within the wire crimp barrel of the terminal in the crimping zone. The display device is configured to display the image.

21 Claims, 10 Drawing Sheets

(56) References Cited

U.S. PATENT DOCUMENTS

| | | | | |
|---|---|---|---|---|
| 8,887,380 | B2 * | 11/2014 | Wasilko | H01R 43/052 29/33 M |
| 9,331,446 | B2 * | 5/2016 | Bluemmel | H01R 43/048 |
| 2007/0079501 | A1 * | 4/2007 | Garner | H01R 43/055 29/753 |
| 2010/0212147 | A1 * | 8/2010 | Malstrom | H01R 43/058 29/753 |
| 2014/0331495 | A1 * | 11/2014 | Nicholas | H01R 43/048 29/863 |
| 2016/0094000 | A1 * | 3/2016 | Deck | G05B 15/02 29/753 |

FOREIGN PATENT DOCUMENTS

| | | |
|---|---|---|
| WO | 2011/117604 A1 | 9/2011 |
| WO | 2012/014674 A1 | 2/2012 |
| WO | 2014/023879 A1 | 2/2014 |

* cited by examiner

TERMINAL CRIMPING SYSTEM WITH WIRE ALIGNMENT AID

BACKGROUND OF THE INVENTION

The subject matter herein relates generally to wire alignment aids in terminal crimping systems.

Electrical terminals may be crimped onto wires by a crimping machine, such as a bench machine or a lead making machine, to form a lead. In a typical crimping operation, a terminal is placed in a crimping zone of the crimping machine and a wire is inserted into a ferrule or barrel of the terminal. Then, a ram of the crimping machine moves toward the wire and terminal along a crimp stroke. The ram pinches or crimps the terminal around the wire, which mechanically and electrically connects the wire to the terminal and forms the lead.

The position and orientation of the wire relative to the terminal in the crimping zone is critical to the overall production performance and efficiency of the crimping machine. For example, production leads have to meet very strict crimp specifications. A wire that is not properly located in either the side-to-side or front-to-back directions relative to the terminal will not meet the crimp specifications. Leads that do not meet crimp specifications are discarded, which wastes time and materials.

Typically, an operator has to make one or more mechanical adjustments to the crimping machine and/or a wire feeder device in order to accurately position the wire relative to the terminal in the crimping zone. However, the wire and the terminal may be of a small scale that makes viewing the wire and terminal, and especially any slight misalignment between the wire and the terminal, difficult to see with the naked eye in order for the operator to determine which adjustments to make. The difficulty of viewing the wire relative to the terminal is further complicated because many crimping machines do not provide an operator with easy access to the working zone where the crimping operation occurs. For example, in automatic lead making machines, multiple wire-handling devices may crowd the working area, and the working sides of the devices may all face a central area of the machine, making it difficult if not impossible for an operator outside of the machine to access and view the crimping zone.

Often, only fine adjustments are needed to separate an accepted lead from a discarded lead. The operator must exercise great care, exceptional vision, and finesse to adjust the crimping machine and/or the wire feeder so that the wire is properly centered relative to the terminal. The inability to view, up close, the wire relative to the terminal may not provide an operator with enough information to make the necessary adjustments in a timely fashion.

BRIEF DESCRIPTION OF THE INVENTION

In one embodiment, a terminal crimping system for a crimping machine includes an anvil, a movable ram, an image acquisition device, and a display device. The anvil is located in a crimping zone and configured to receive a terminal thereon. The terminal has a wire crimp barrel configured to receive a wire therein. The ram has crimp tooling configured to crimp the wire crimp barrel of the terminal to the wire during a crimp stroke of the ram. The image acquisition device is configured to be mounted on the crimping machine above the crimping zone. The image acquisition device is positioned to acquire an image of the wire within the wire crimp barrel of the terminal in the crimping zone. The display device is configured to display the image.

In one embodiment, a method of aligning a wire with a terminal disposed on a terminal crimping system includes mounting an image acquisition device to a crimping machine above a crimping zone. The crimping machine has a movable ram and an anvil. The anvil is located in the crimping zone and configured to receive a terminal thereon. The terminal has a wire crimp barrel configured to receive a wire therein. The ram has crimp tooling configured to crimp the terminal on the anvil to the wire during a crimp stroke of the ram. The image acquisition device is positioned to acquire at least one image of the wire within the crimp barrel of the terminal in the crimping zone. The method also includes acquiring an image of the wire within the crimp barrel of the terminal in the crimping zone prior to the terminal being crimped to the wire. The method further includes displaying the image on a display device, and superimposing an alignment line of the terminal and an alignment line of the wire on the image that is displayed on the display device.

DETAILED DESCRIPTION OF THE INVENTION

Figure 1:
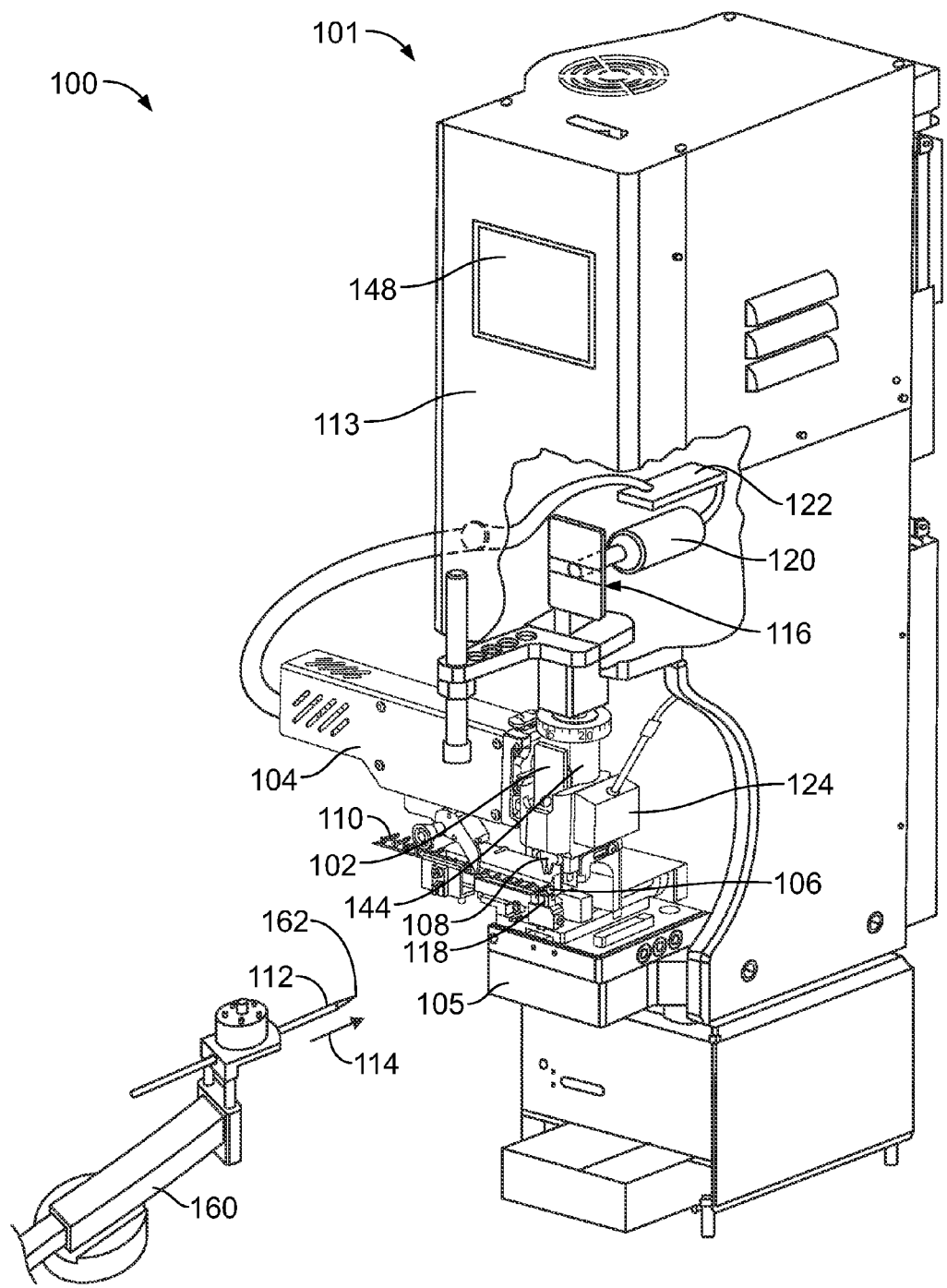
FIG. 1 is a perspective view of a terminal crimping system according to an exemplary embodiment.

FIG. 1 is a perspective view of a terminal crimping system 100 according to an exemplary embodiment. The terminal crimping system 100 includes at least an anvil 118, a movable ram 144, an image acquisition device 124, and a display device 148. The anvil 118 and ram 144 may be components of a crimping machine 101. The crimping machine 101 is illustrated as a terminal crimping machine, such as a bench machine or an automatic lead making machine, used for crimping connectors to wires. Alternatively, the crimping machine 101 may be another type of crimping machine such as a lead frame machine. However, other types of machines that attach connectors to wires using processes other than crimping may be used, such as an insulation displacement connector (IDC) machine, a welding machine, and the like.

The crimping machine 101 may include an applicator 102 that mechanically crimps the connector to the wire. The applicator 102 may be coupled to a base or support 105 of the crimping machine 101. The applicator 102 may include the movable ram 144 and the stationary anvil 118. The anvil 118 is located in a crimping zone or terminating zone 106 and receives a connector, such as a terminal 110, thereon. The movable ram 144 moves along a crimp stroke towards and away from the anvil 118 in the crimping zone 106. The movable ram 144 has crimp tooling 108 at a distal end thereof that engages the terminal on the anvil 118 and crimps the terminal to a wire 112 that is loaded within the terminal 110. Optionally, the crimping machine 101 may allow for the applicator 102 to be removed and replaced with a different applicator, such as when the applicator 102 is worn or damaged or when an applicator having a different configuration is desired.

The image acquisition device 124 is mounted to the crimping machine 101. The image acquisition device 124 may be an electronic microscope, borescope, digital camera, video camera, or the like. The image acquisition device 124 may be mounted to the support 105 of the crimping machine 101, to the applicator 102, or to another structure in the vicinity of the crimping zone 106. In the illustrated embodiment, the image acquisition device 124 is mounted to the applicator 102. In an exemplary embodiment, the image acquisition device 124 is positioned to have a field of view that includes the crimping zone 106. The image acquisition device 124 may acquire images and/or video of the crimping zone 106, and transmit image and/or video data representative of the images and/or videos, respectively, to a receiving device that may be located on the crimping machine 101 or at an external location apart from the crimping machine 101. For example, the receiving device may be a storage device (not shown), a display device 148, or a device with both a display and a storage component.

The display device 148 is communicatively coupled to the image acquisition device 124 and configured to display the images and/or videos acquired by the image acquisition device 124. The display device 148 may communicate with the image acquisition device 124 via a wired or wireless connection. The display device 148 may be integrated into a host computer (not shown) of the crimping machine 101 or may be at least a display component of a separate computer, such as a desktop computer, a laptop computer, a tablet computer, a monitor, a projector, and the like. Optionally, the display device 148 may be a crimp quality monitor (CQM) device (not shown). As shown in FIG. 1, the display device 148 may be located on the crimping machine 101 and viewable through a panel 113 so the operator may easily view the displayed images while adjusting and operating the crimping machine 101. Thus, the image acquisition device 124 and display device 148 provide an alignment aid to the operator of the crimping machine 101. Alternatively, the display device 148 may be proximate to, but not on, the crimping machine 101. As described further below, the display device 148 may include a touchscreen or another user interface that allows an operator to navigate the display device 148.

The image acquisition device 124 may additionally have a macro capability, such that the images and/or videos acquired may be magnified when displayed on the display device 148. Therefore, the operator of the terminal crimping system 100 may be able to align the wire 112 with the terminal 110 in the crimping zone 106 more easily than by the naked eye alone. Optionally, the terminal crimping system 100 may automatically adjust the position of the wire 112 relative to the terminal 110 and/or crimp tooling 108 using the acquired images, rather than requiring manual adjustments. In other embodiments, the terminal 110, the anvil 118 and/or the crimp tooling 108 may be adjusted either manually or automatically based on the images.

The wire 112 may be presented to the crimping zone 106 by a feeder device 160. The feeder device 160 is configured to feed an end portion 162 of the wire 112 in a wire feed direction 114 onto or into a corresponding terminal 110 located in the crimping zone 106 for the terminal 110 to be crimped to the wire 112 during a crimp stroke of the ram 144. The location and orientation of the wire 112 within the terminal 110 after a completed feed stroke of the feeder device 160 (for example, when the feeder device 160 ceases applying force to the wire 112) is referred to herein as a feed position. The feeder device 160 may be a transfer arm 160, as shown in FIG. 1. The transfer arm 160 is configured to rotate and translate along various axes in order to move individual segments of wire 112 toward and away from the crimping zone 106. For example, after a crimping operation, the transfer arm 160 may pivot, extend, and/or contract to present the segment of wire 112 to another processing station at a different location for another processing operation. Alternatively, or in addition to using a transfer arm, the feeder device 160 may be or include a belt wire feeder or a roller wire feeder that propels the wire 112 towards the crimping zone 106 by applying a friction force to the wire 112. The wire 112 may originate from a bulk wire source (not shown). Optionally, one or more guide tubes (not shown) may be used to direct the wire 112 from the bulk wire source towards the feeder device 160 and/or from the feeder device 160 towards the crimping zone 106.

Optionally, the terminals 110 may be fed to the crimping zone 106 of the applicator 102 by a terminal feeder device 104. The feeder device 104 may be positioned adjacent to, or even coupled to, the applicator 102. Alternatively, the feeder device 104 may be positioned remote with respect to the applicator 102, but still delivers the terminals 110 to the crimping zone 106. The terminals 110 may be guided to the crimp zone 106 by a guide member (not shown). The feeder device 104 may be configured to deliver, and the applicator 102 may be configured to receive, multiple different sizes of terminals 110 for crimping. For example, the feeder device 104 may deliver either side-feed terminals or end-feed terminals. Side-feed terminals are arranged side-by-side on a carrier strip and end-feed terminals are arranged successively, end-to-end. The crimping machine 101 is configured to receive applicators for either type of terminal, namely the side-feed or the end-feed terminals. Thus a first type of applicator may be configured to receive side-feed terminals and a second type of applicator may be configured to receive end-feed terminals. The side-feed and end feed types of applicators may be interchanged within the crimping machine 101. The applicator 102 illustrated in FIG. 1 is a side-feed type applicator, and the terminals 110 are side-feed terminals.

During a crimping operation, the crimp tooling 108 is driven through a crimp stroke by a driving mechanism 116 of the crimping machine 101 initially towards the stationary anvil 118 and finally away from the anvil 118. Thus, the crimp stroke has both a downward component and an upward component. The crimping of the terminal 110 to the wire 112 occurs during the downward component of the crimp stroke. The crimp tooling 108 engages the terminal 110 and crimps the terminal 110 onto the wire 112 by compressing the terminal 110 between the crimp tooling 108 and the anvil 118. In an exemplary embodiment, the driving mechanism 116 is driven by a crimping machine actuator 120. Optionally, the crimping machine actuator 120 may be a motor having a drive shaft that moves the driving mechanism 116. Alternatively, the crimping machine actuator 120 may be a linear actuator, a piezoelectric actuator, a pneumatic actuator, and the like. The operation of the crimping machine actuator 120 is controlled by a control module 122.

Figure 2:
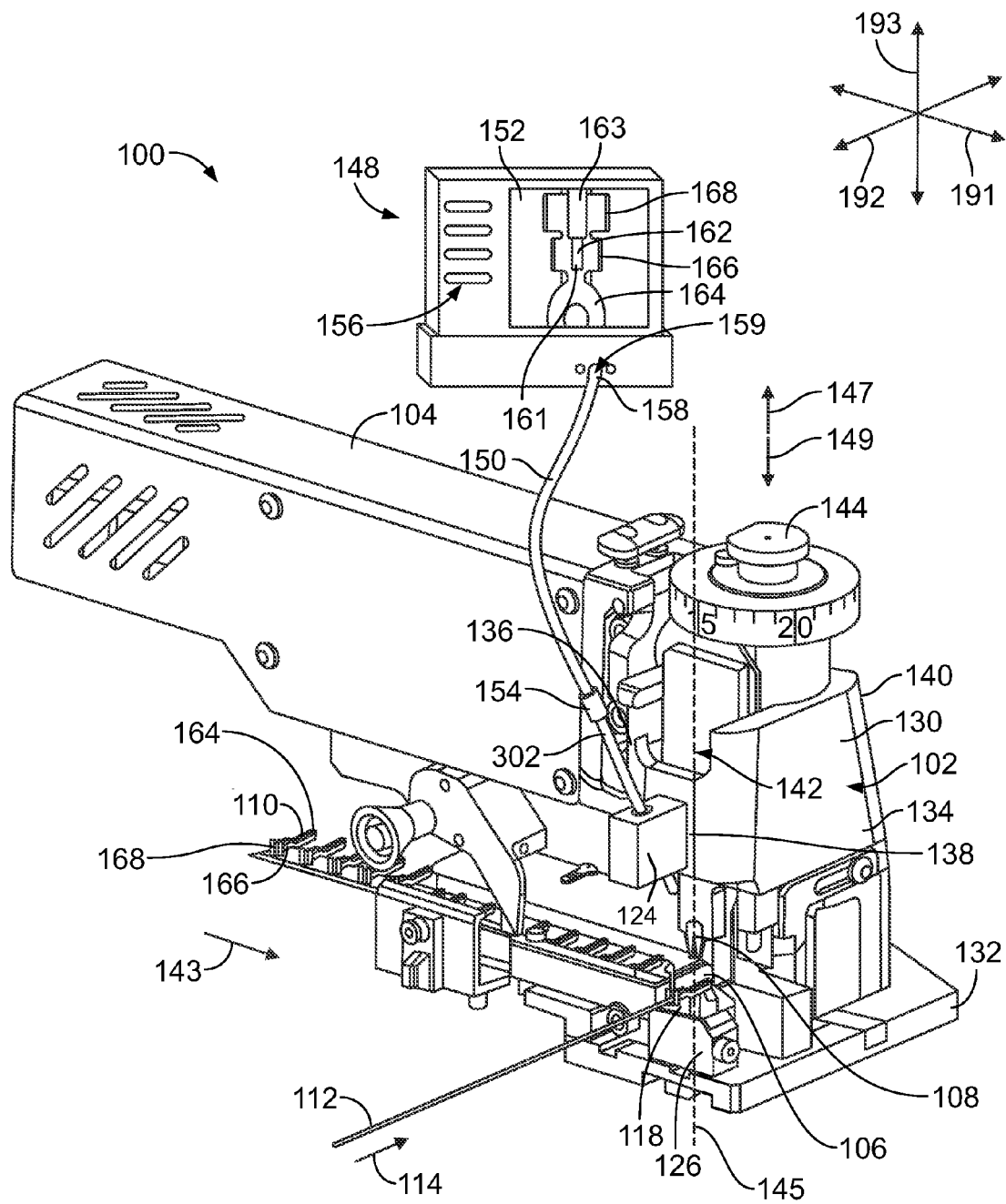
FIG. 2 is a perspective view of an exemplary embodiment of the terminal crimping system that includes a side-feed type applicator and a feeder device.

FIG. 2 is a perspective view of an exemplary embodiment of the terminal crimping system 100 that includes a side-feed type applicator 102 and a feeder device 104. The applicator 102 and the feeder device 104 may be components of the crimping machine 101 shown in FIG. 1. The applicator 102 includes a frame 130 having a base 132. The anvil 118 is coupled to the base 132 through a base plate 126. The base plate 126 may be coupled to the base 132 in a manner that would permit vertical movement of the plate 126 using an adjustment mechanism, such as an adjusting screw. The frame 130 includes a front 134, a rear 136, a left side 138, a right side 140, and a central cavity 142. As used herein, relative or spatial terms such as "front," "back," "left," "right," "top," and "bottom" are only used to distinguish the referenced elements and do not necessarily require particular positions or orientations in the crimping system 100 or in the surrounding environment of the crimping system 100. The feeder device 104 may be positioned adjacent to the rear 136, and the terminals 110 are carried or advanced in a terminal feed direction 143 from the rear 136 towards the front 134 of the frame 130. In the illustrated embodiment, the anvil 118 may be disposed closer to the left side 138 of the frame 130 than the right side 140. The ram 144 is received within the central cavity 142 and is movable with respect to the frame 130. The crimp tooling 108 is coupled to the ram 144 and is positioned adjacent to the left side 138. The crimp tooling 108 and the anvil 118 are vertically aligned with each other along a crimping axis 145. Optionally, the crimp tooling 108 and the anvil 118 are removable from the ram 144 and the base plate 126, respectively, to allow for substituting other types and/or sizes of crimp tooling and/or anvils. Different types and sizes of terminals 110 and wires 112 may be used with the applicator 102.

The ram 144 is coupled to the driving mechanism 116 (shown in FIG. 1) of the applicator 102. The driving mechanism 116 moves the ram 144 vertically in a lifting or reset direction 147 generally away from the anvil 118, and also in a crimping direction 149 generally toward the anvil 118. The feeding of the wire 112, the feeding of the terminals 110, and the driving of the ram 144 are coordinated. For example, as the ram 144 is moved in the lifting direction 147, the terminals 110 are advanced in the feed direction 143 by the terminal feeder device 104 to a feed position on the anvil 118 in the crimping zone 106. Soon after, the wire 112 is advanced in the wire feed direction 114 such that the end portion 162 of the wire 112 is received on or in the terminal 110. Once the wire 112 is loaded into the terminal 110, the ram 144 begins the crimp stroke in the crimping direction 149. Optionally, the wire 112 and/or the terminals 110 may be advanced while the ram 144 is moved in the crimping direction 149, so as to reduce the total time spent on each crimping operation.

The wire 112 may include a conductive core 161 that is surrounded or covered by an insulation layer 163. Optionally, the insulation layer 163 may be disposed along the wire 112 between the conductive core 161 and an outer jacket or a braid (not shown). The insulation layer 163 may extend along most of the wire 112, but a distal end of the conductive core 161 may protrude from the insulation layer 163 at the end portion 162 of the wire 112 for electrical termination to the terminal 110. As used herein, the end portion 162 of the wire 112 refers to the distal end of the conductive core 161 that protrudes from the insulation layer 163.

The terminal 110 may be formed of a conductive material, such as metal. For example, the terminal 110 may be stamped and formed out of sheet metal. Each terminal 110 may have a mating portion 164, a wire crimp barrel 166, and an insulation support barrel 168. The mating portion 164 is configured to mechanically engage a mating connector (not shown). The wire crimp barrel 166 is configured to be crimped to the conductive core 161 of the wire 112 at the end portion 162 that protrudes from the insulation layer 163 to mechanically and electrically connect the terminal 110 to the wire 112. The wire crimp barrel 166 or ferrule may be an open barrel having two wings 534, 634 (shown in FIG. 6), or a closed barrel. The insulation support barrel 168 is configured to be crimped to the insulation layer 163 of the wire 112 in order to provide stress relief for the connection between the conductive core 161 and the wire crimp barrel 166.

In an embodiment, the feeder device 160 (shown in FIG. 1) feeds the wire 112 to the crimping zone 106 such that the end portion 162 of the wire 112 is located on or in the terminal 110 located on the anvil 118. For example, the wire 112 may be disposed on an open wire crimp barrel between the two wings of the open barrel, or the wire 112 may be disposed within a cylindrical portion of a closed wire crimp barrel. During the crimp stroke, the ram 144 moves in the crimping direction 149, and the crimp tooling 108 engages the wire crimp barrel 166 of the terminal 110. For example, the crimp tooling 108 may have two teeth that pinch the wire crimp barrel 166 between the teeth and the anvil 118, forcing the crimp barrel 166 to bend and contract in size, gripping the wire 112 in the process. As the ram 144 moves in the lifting direction 147, the terminal 110 is fixed to the wire 112, forming a lead. But, the small scale of the wire 112 and terminals 110 and the difficulty viewing the crimping zone 106 may cause difficulty when aligning the wires 112 relative to the terminals 110. Additionally, in order to meet the strict assembled lead specifications, the alignment between the wire 112 and terminal 110 must be considerably exact. The image acquisition device 124 and the display device 148 provide an alignment aid for making necessary adjustments to the applicator 102, which improves production efficiency of assembled electrical leads.

In an exemplary embodiment, the image acquisition device 124 is mounted above the crimping zone 106 and positioned to look down onto the crimping zone 106 from above. The image acquisition device 124 has at least a two-dimensional field of view that includes a lateral or x axis 191 and longitudinal or y axis 192. In the illustrated embodiment, the image acquisition device 124 is mounted to the frame 130 of the applicator 102. For example, the image acquisition device 124 may be mounted on the left side 138 of the frame 130, which is the side proximate to the anvil 118 and the crimping zone 106. Mounting the image acquisition device 124 at least proximate to the crimping axis 145 that extends through the anvil 118 and crimp tooling 108 along the crimp stroke allows the image acquisition device 124 to look down from almost directly above the crimping zone 106, which allows for better visual guidance and also may improve image analysis of the acquired images. For example, the field of view captured by the image acquisition device 124 shows how the wire 112 is aligned side-to-side along the x axis 191 and front-to-back along the y axis 192 relative to the terminal 110. In addition, the field of view captured also may show how the wire 112 is oriented angularly relative to the terminal 110.

It should be noted that the mounted position of the image acquisition device 124 on the left side 138 of the frame is merely an illustration of one possible mounting location. In other embodiments, the image acquisition device 124 may be mounted to a wall or an overhead ledge of the crimping machine 101 (shown in FIG. 1), to the ram 144, to another side of the frame 130, and the like. In addition, the image acquisition device 124 may be mounted to the base 132 or another structure that is below the crimping zone 106, but the image acquisition device 124 may include a scope that extends over the crimping zone 106 and is oriented to face downwards to view the crimping zone 106 from above. Mirrors or other image guides, such as fiber optics, may be used to provide an acceptable field of view and image angle even if space constraints do not allow for placement of the image acquisition device 124 in desired positions.

Optionally, another image acquisition device (not shown) may be mounted to the base 132 of the frame 130 next to the anvil 118 and generally aligned along the same plane defined by the x and y axes 191, 192 as the anvil 118 such that the field of view shows the height of the wire 112 along an elevation or z axis 193 relative to the terminal 110. By using the image acquisition device 124 to capture the relative position and/or orientation of the wire 112 to the terminal 110 along the lateral and longitudinal axes 191, 192, and the additional image acquisition device to capture the position and/or orientation of the wire 112 relative to the terminal 110 along the elevation axis 193, a full three-dimensional view of the crimping zone 106 may be provided. As an alternative to using another image acquisition device, the image acquisition device 124 may be moved to the base 132 from the frame 130 in order to capture the three-dimensional field of view without using additional image acquisition devices.

Figure 3:
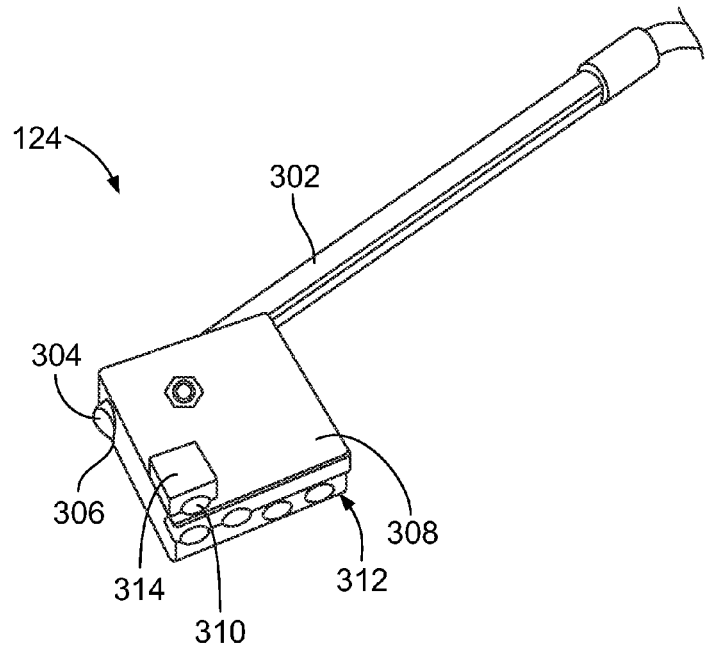
FIG. 3 is a perspective view of an image acquisition device according to an exemplary embodiment.

FIG. 3 is a perspective view of the image acquisition device 124 according to an exemplary embodiment. The image acquisition device 124 may include a rigid or flexible tube 302 with a lens 304 at a distal end 306. The lens 304 may have macro capability that allows the image acquisition device 124 to produce magnified images and/or videos. The distal end 306 may also include optical fibers or light emitting diodes (LEDs) (not shown) for illuminating the field of view of the lens 304.

The image acquisition device 124 includes a mounting fixture 308 that is removably mounted to the crimping machine 101 (shown in FIG. 1) at various locations as described above. The mounting fixture 308 optionally may include magnets 310 along a bottom side 312 of the mounting fixture 308 that allow the image acquisition device 124 to be magnetically mounted to the crimping machine 101. Alternatively, the mounting fixture 308 may be mounted and held in place by using clamps, fasteners, latches, adhesives, and/or the like. Optionally, the mounting fixture 308 may be keyed to the crimping machine 101 in a single orientation for repeatable alignment of the image acquisition device 124 upon removing and then remounting the image acquisition device 124 to the crimping machine 101. For example, the mounting fixture 308 may include a keying feature 314 proximate to the bottom 312, and the corresponding mounting location on the crimping machine 101 may include a groove or track (not shown) that is configured to receive the mounting fixture 308 in only a single orientation relative to the crimping machine 101. Therefore, the field of view captured by the image acquisition device 124 in the acquired images remains constant during subsequent crimping operations. While the mounting fixture 308 is illustrated as a rectangular box-like structure, the mounting fixture 308 may have other shapes. Alternatively, the image acquisition device 124 may be provided without the use of a mounting fixture 308.

Referring back to FIG. 2, the display device 148 may be coupled to the image acquisition device 124 through a cable 150 that extends from a proximal end 154 of the tube 302 of the image acquisition device 124. The other end of the cable 150 may be configured as an input connector 158, such as a USB mating connector. The input connector 158 removably plugs into an input port 159 of the display device 148. Alternatively, the display device 148 may communicate wirelessly through induction, radio frequency waves, Wi-Fi, and the like to transmit data between the image acquisition device 124 and the display device 148.

The display device 148 includes a monitor 152 which displays images and/or video acquired by the image acquisition device 124. In an exemplary embodiment, the acquired images and/or video are magnified when displayed on the monitor 152 of the display device 148. The images and/or video displayed on the monitor 152 optionally may be updated to show each wire 112 loaded into a corresponding terminal 110 prior to a crimping operation. The display device 148 may show an updated image of one wire 112 within the corresponding terminal 110 after adjusting a position of the wire 112 to provide magnified visual feedback of the adjustment. Optionally, the display device 148 is configured to display a live feed of the crimping zone 106 instead of, or in addition to, individual photographs. As described further below, the display device 148 may include a user interface 156 that allows a user or operator to navigate the display device 148 and select between display options.

As shown in FIG. 2, the monitor 152 of the display device 148 displays an image of the wire 112 and the terminal 110 in the crimping zone 106. The image may be an individual image (or picture) or one frame of a video captured by the image acquisition device 124. Since the image acquisition device 124 is mounted above the crimping zone 106 and facing downwards, the monitor displays a top-down view of the wire 112 and terminal 110 in the crimping zone 106. For example, the parts of the terminal 110, such as the mating portion 164, the wire crimp barrel 166, and the insulation support barrel 168, are visible on the monitor 152. In addition, the parts of the wire 112, including the wire end portion 162 and the insulation 163, are visible relative to the terminal 110. As shown, the wire 112 and the terminal 110 are magnified in the displayed image and appear larger than in actuality. Therefore, a viewer of the monitor 152, such as an operator of the crimping machine 101 (shown in FIG. 1), is able to view the relative alignment of the wire 112 compared to the terminal 110 in fine detail without the need to be right next to the crimping zone 106.

Figure 4:
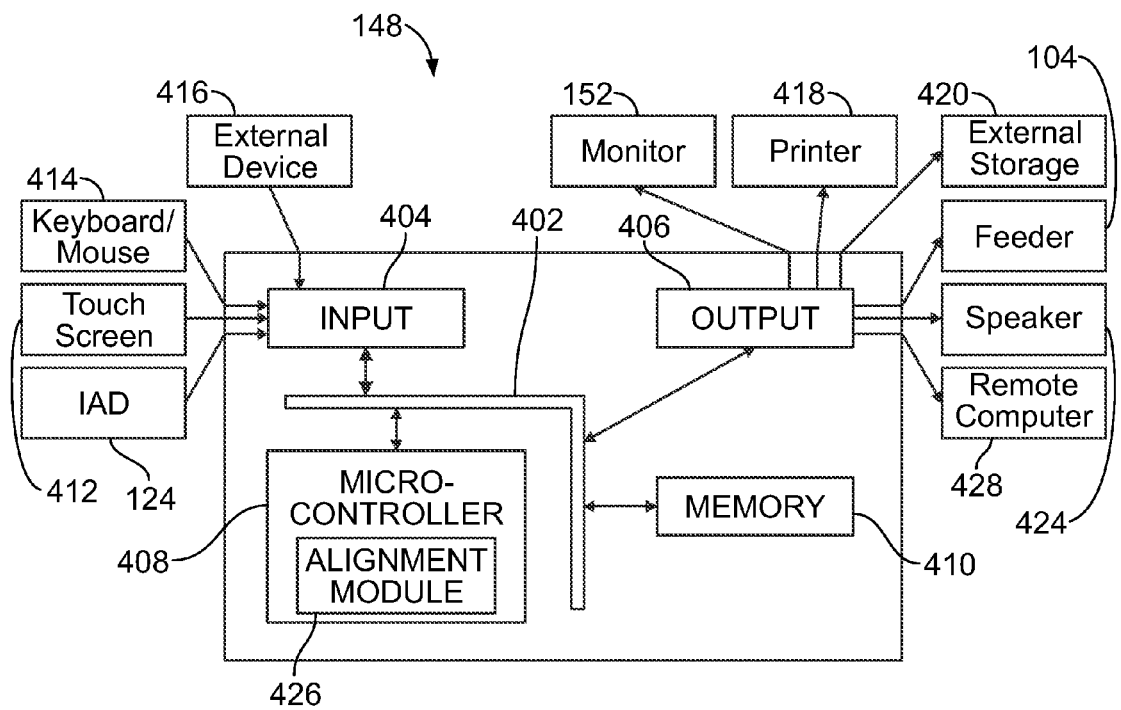
FIG. 4 is a functional block diagram of a display device according to an exemplary embodiment.

FIG. 4 is a functional block diagram of the display device 148 according to an exemplary embodiment. The display device 148 includes an internal bus 402 that electrically connects and/or interfaces with, for example, an input module 404, an output module 406, a microcontroller 408, and/or a memory 410. The internal bus 402 is an address and/or data bus that transfers information in the form of signals between the various components described herein. The input module 404 may be configured to receive information from various inputs, including, for example, the image acquisition device 124, a touch screen 412 on the monitor 152, a keyboard and/or mouse 414, and an external device 416, such as a smart phone, tablet, remote computer, and the like. The image and/or video data acquired by the image acquisition device 124 may be received by the display device 148 at the input module 404. The touch screen 412 accepts an operator touch input when selections are made on the user interface 156 (shown in FIG. 2) on the monitor 152. The input devices may be used, for example, to select edges of the wire 112 (shown in FIG. 2) and/or the terminal 110 (shown in FIG. 2) on a displayed image for aligning the wire 112 with the terminal 110, or to enter measured dimensions of the wire 112 and/or the terminal 110 in order to calibrate the displayed image, both of which described further below.

The output module 406 may communicate information from the display device 148 to the monitor 152, a printer 418, an external storage device 420 (e.g., flash disk, floppy disk, CD, DVD, external hard drive, server, etc.), the wire feeder device 160 (shown in FIG. 1), the terminal feeder device 104 (FIG. 1), a speaker 424, a remote computer 428, and the like. Once calibrated, the display device 148 may be configured to automatically send adjustment commands to the wire feeder device 160. The adjustment commands order the feeder device 160 to modify the feed position of the wire 112 (shown in FIG. 2) to better align the wire 112 in the feed position with the terminal 110 (shown in FIG. 2). The amount of modification may be based on a calibrated variable optionally stored in the memory 410. The output module 406 also may send data to the external storage device 420 and/or the remote computer 428 using wired or wireless direct connections or network connections (i.e. local area network or Internet).

The display device 148 includes a microcontroller 408 that is designed to control various operations and connectivity between the input module 404, the output module 406, and the memory 410. The microcontroller 408 may include electric circuits, such as a microprocessor (or equivalent control circuitry), RAM and/or ROM memory, logic and timing circuitry, state machine circuitry, and/or I/O circuitry, for interfacing with the input and output modules 404, 406, respectively. In an exemplary embodiment, the microcontroller 408 includes an alignment module 426. The alignment module 426 is configured to assist the alignment of the wires 112 (shown in FIG. 2) relative to the terminals 110 (shown in FIG. 2), and vice-versa, to consistently produce quality leads. The alignment module 426 may be implemented in hardware as part of the microcontroller 408. For example, the alignment module 426 may include one or more processors. Alternatively, the alignment module 426 may be implemented as software/firmware instructions programmed into and executed by the microcontroller 408. Alternatively, the alignment module 426 may reside separately from the microcontroller 408 as a standalone component. As described further herein, the alignment module 426 is configured to superimpose one or more alignment lines of the wire 112 and one or more alignment lines of the terminal 110 on an image displayed on the monitor 152 of the display device 148. By comparing the relative locations of the alignment lines, the operator of the terminal crimping system 100 (shown in FIG. 2) may determine how the position of the wire 112 should be adjusted relative to the terminal 110 in the crimping zone 106 (shown in FIG. 2) to produce a quality crimped lead.

The memory 410 may include a hard disk drive, RAM, ROM, and/or another internal data storage device. The memory 410 may be configured to store image and/or video data acquired by the image acquisition device 124 (shown in FIG. 2) for quality reporting purposes or for comparing current displayed images to former displayed images. In addition, the memory 410 may store operator input information, such as the locations of operator-selected alignment lines of the wires 112 and/or terminals 110 (both shown in FIG. 2). For example, once one or more alignment lines of the terminal 110 are determined, a location of the line(s) may be stored in the memory 410. The one or more lines may be recalled from the memory 410 by the microcontroller 408 to display the line(s) in a subsequent image that shows the wire 112 relative to the terminal 110. In addition, the memory 410 may store measured dimensions for calibration purposes. Furthermore, the memory 410 may store additional information, such as the number of terminals 110 crimped during a crimping session.

FIGS. 5-10 display various screen shots displayed on the monitor 152 of the display device 148 (shown in FIG. 2) according to an exemplary embodiment. The screen shots may be displayed sequentially according to a wire alignment process for aligning segments of wire 112 (shown in FIG. 2) relative to corresponding terminals 110 (shown in FIG. 2) within the terminal crimping machine 101 (shown in FIG. 2). The wire alignment process, or a similar process, may be used to better align fed wires 112 with terminals 110 to more efficiently produce high quality leads.

Figure 5:
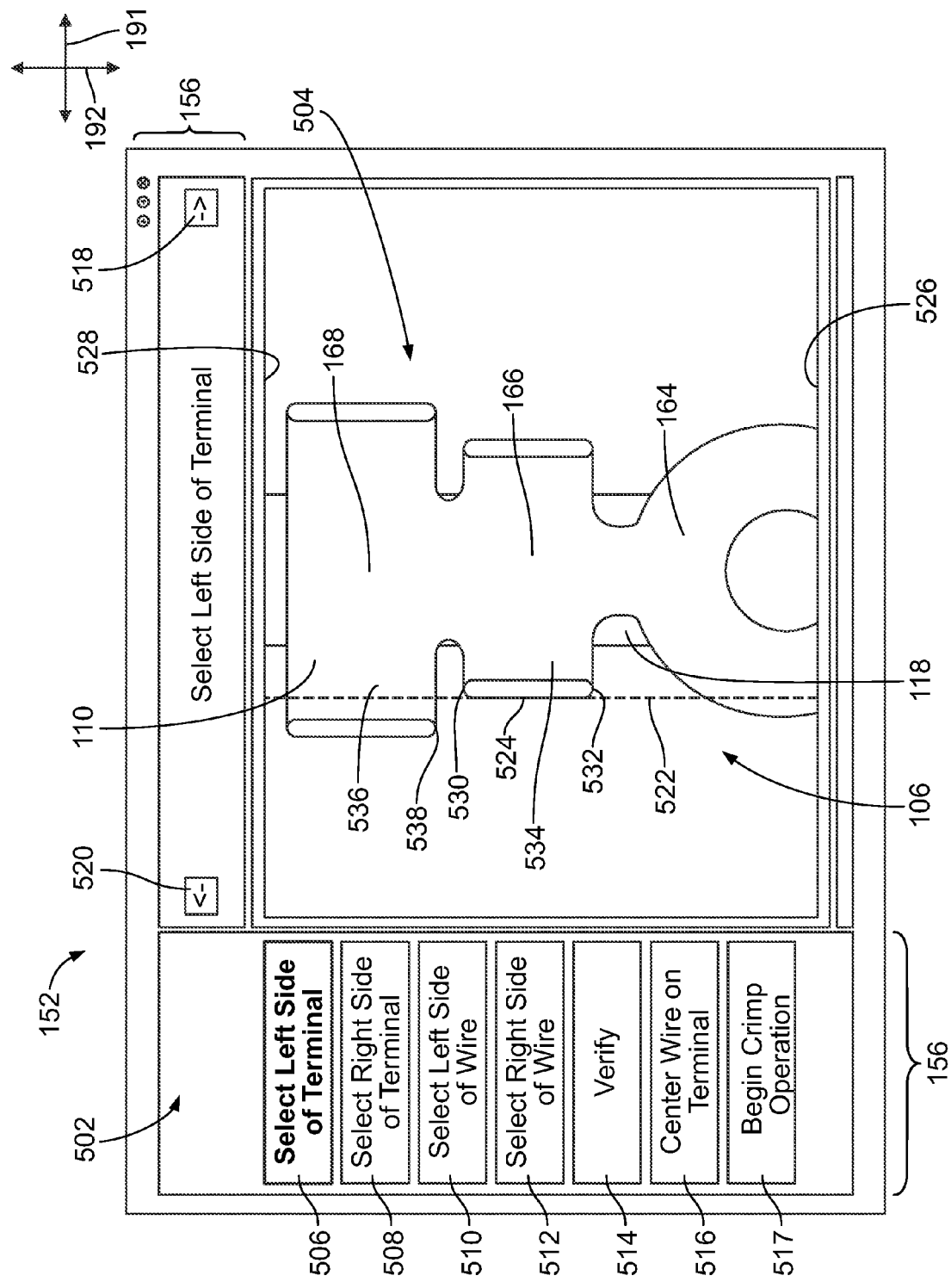
FIG. 5 shows a first screen shot displayed on a monitor of a display device according to an exemplary embodiment.

FIG. 5 shows a screen shot 502 that includes an image 504 depicting the terminal 110 in the crimping zone 106. The image 504 was acquired by the image acquisition device 124 (shown in FIG. 2) that is positioned above the crimping zone 106. The image 504 may be single photograph or a single frame of a video. The terminal 110 is disposed on the anvil 118. The image 504 is used to determine the alignment of the terminal 110, which will then be used for aligning a wire 112 (shown in FIG. 2) with the terminal 110. The wire 112 is not present in image 504 because the wire 112 has not been fed to the crimping zone 106, but, in other embodiments, the wire 112 may be present in the crimping zone 106 while the alignment of the terminal 110 is determined. The screen shot 502 also includes a user interface 156 that is on one or more sides of the image 504. The user interface 156 includes various selectable buttons that allow an operator to interact with and navigate the display device 148 (shown in FIG. 2). For example, the user interface 156 may include a "Select Left Side of Terminal" button 506, a "Select Right Side of Terminal" button 508, a "Select Left Side of Wire" button 510, a "Select Right Side of Wire" button 512, a "Verify" button 514, a "Center Wire on Terminal" button 516, and/or a "Begin Crimp Operation" button 517. Optionally, the user interface 156 may include a right arrow button 518 to advance to a next screen and a left arrow button 520 to go back to a previous screen.

In screen shot 502, the "Select Left Side of Terminal" button 506 is highlighted, and an alignment line 522 is displayed on the image 504. The alignment line 522 is a vertical line that is superimposed on the image 504 by the alignment module 426 (shown in FIG. 4), and extends from a bottom 526 of the image 504 to a top 528 of the image 504. The alignment line 522 is shown as a dashed line, but the alignment line 522 alternatively may be a solid line, a short line segment, a single bullet point, or the like.

In an embodiment, the location of the alignment line 522 is based on an operator input. For example, the operator may use an input device such as the keyboard/mouse 414, touch screen 412, or external device 416 of the display device 148 (all shown in FIG. 4). Optionally, the alignment line 522 may be superimposed on the image 504 and configured to be manipulated by an operator to line up with a left edge 524 of the terminal 110. The operator manipulates the line 522 by dragging the line 522 into position or selecting the position where the line 522 should be located. For example, the operator may select one or more points along the left edge 524 of the terminal 110, and the alignment module 426 (shown in FIG. 4) may be configured to construct and display the alignment line 522 as a line that connects all of the selected points. The selected points, for example, may include a rear end 530 and a front end 532 of a left wing 534 of the wire crimp barrel 166. The rear end 530 is proximate to the insulation support barrel 168, and the front end 532 is proximate to the mating portion 164. In an embodiment, the operator may be prompted to also select a front end 538 of a left wing 536 of the insulation support barrel 168, which may be used to determine proper placement of an insulating layer of the wire 112 (shown in FIG. 2) relative to the insulation support barrel 168. By selecting the rear and front ends 530, 532 of the left wing 534 of the wire crimp barrel 166, the alignment module 426 may construct and display the alignment line 522 to extend through both selected points on the image 504.

In addition, by selecting the rear and front ends 530, 532, the alignment module 426 may be configured to determine a midpoint of the wire crimp barrel 166 that is halfway between the rear and front ends 530, 532 generally along the y axis 192. The midpoint may be used to determine a midline that extends generally along the x axis 191 and bisects the wire crimp barrel 166. The wire crimp barrel 166 may be used to determine the alignment of the terminal 110 because the wire crimp barrel 166 is the portion of the terminal 110 that is crimped to the exposed end portion 162 (shown in FIG. 2) of the wire 112 (shown in FIG. 2). In alternative embodiments, however, other portions of the terminal 110 may be used to determine the alignment of the terminal 110, as long as the left and right edges of the same portion are used to determine the center of the terminal 110. After the line 522 is aligned with the left edge 524 of the terminal 110, the operator may select either the "Select Right Side of Terminal" button 508 or the right arrow button 518 to advance to the next step. Optionally, the display device 148 may be configured to advance automatically once the alignment line 522 is set.

Figure 6:
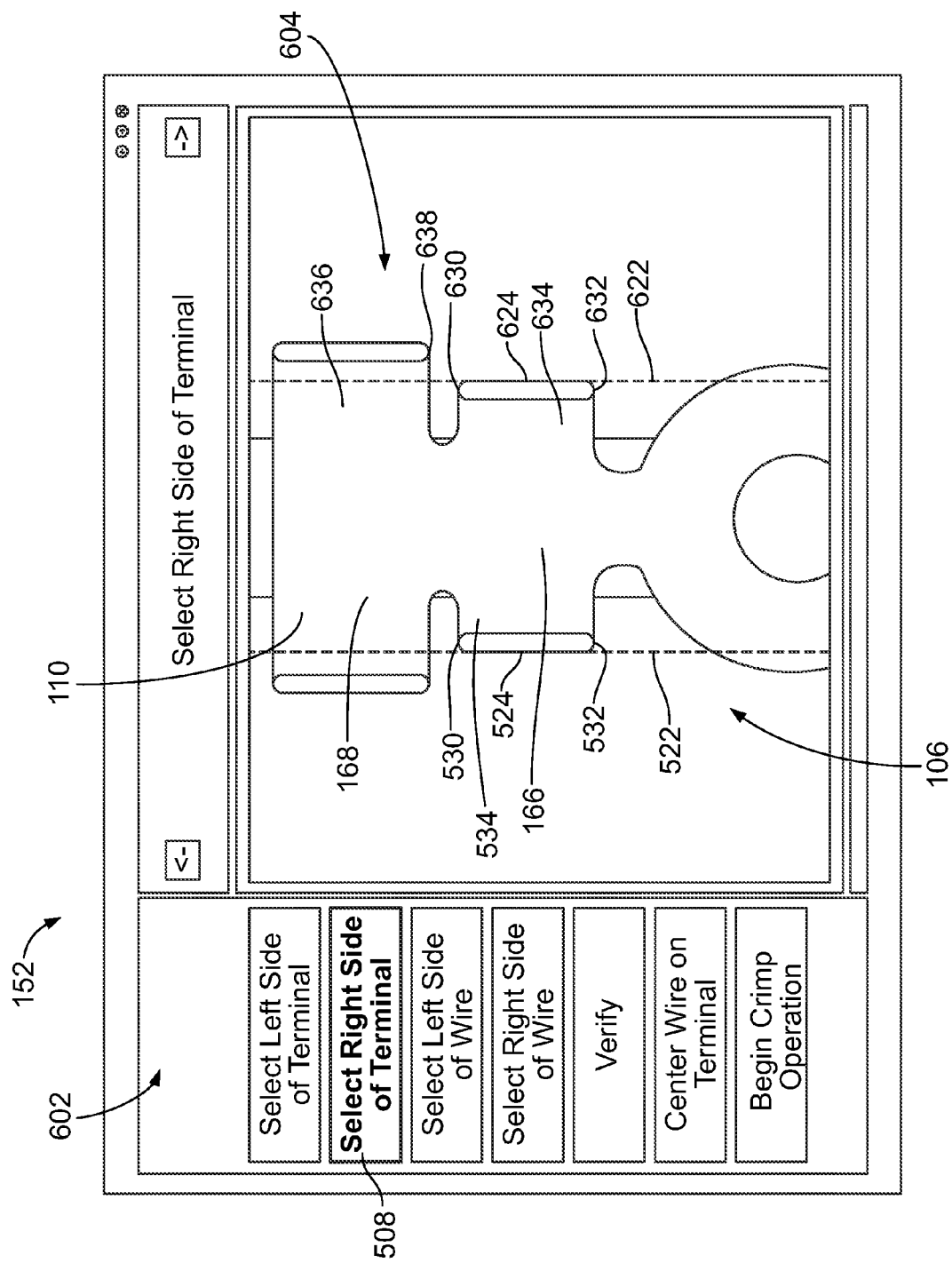
FIG. 6 shows a second screen shot displayed on the monitor according to an exemplary embodiment.

FIG. 6 shows a screen shot 602 on the monitor 152 that includes an image 604 depicting the terminal 110 in the crimping zone 106. The screen shot 602 may be subsequent to screen shot 502 (shown in FIG. 5) in the process for aligning a wire 112 (shown in FIG. 2) relative to the terminal 110 prior to crimping. The image 604 optionally may be the same acquired image as the image 504 (shown in FIG. 5). In the screen shot 602, the "Select Right Side of Terminal" button 508 is highlighted, and an alignment line 622 is displayed on the image 604. The alignment line 622 may have a similar appearance as the alignment line 522 in FIG. 5 to indicate that both alignment lines correspond to the same component (for example, the terminal 110). Optionally, the alignment lines 522, 622 may both be superimposed simultaneously on the image 604, as shown, or only the alignment line 622 may be shown during this step. The alignment line 622 is manipulated to line up with a right edge 624 of the terminal 110. The operator manipulates the line 522 by dragging the line 522 into position or selecting the position where the line 522 should be located. The selected points, for example, may include a rear end 630 and a front end 632 of a right wing 634 of the wire crimp barrel 166. The rear end of the wire crimp barrel 166 is defined by both the rear end 630 of the right wing 634 and the rear end 530 of the left wing 534. The front end of the wire crimp barrel 166 is defined by both the front end 632 of the right wing 634 and the front end 532 of the left wing 534. In other embodiments, the terminal 110 may have a closed wire crimp barrel 166 that does not include left and right wings 534, 634, but the rear and front ends of the wire crimp barrel may be determined the same way as described above. Optionally, the screen shot 602 may be prior to the screen shot 502, so the right edge 624 of the terminal 110 is aligned prior to the left edge 524 (shown in FIG. 5). In an embodiment, the operator may be prompted to also select a front end 638 of a right wing 636 of the insulation support barrel 168.

Once both the left alignment line 522 and the opposite right alignment line 622 are aligned with the respective edges 524, 634 of the terminal 110, the alignment module 426 (shown in FIG. 4) may be configured to calculate the location of a centerline 906 (shown in FIG. 9) of the terminal 110. The centerline 906 may be calculated by determining the midpoint between lines 522 and 622 along a horizontal axis. The locations of the lines 522, 622 and centerline 906 may be stored in the memory 410 (shown in FIG. 4) of the display device 148 (shown in FIG. 4). In a more automated alternative embodiment, the left edge 524 and the right edge 624 of the terminal 110 may be identified and the centerline 906 calculated automatically by the alignment module 426 using image analysis techniques known in the field. Using image analysis would obviate the need for an operator to manually select the position of the alignment lines 522 and 622.

Figure 7:
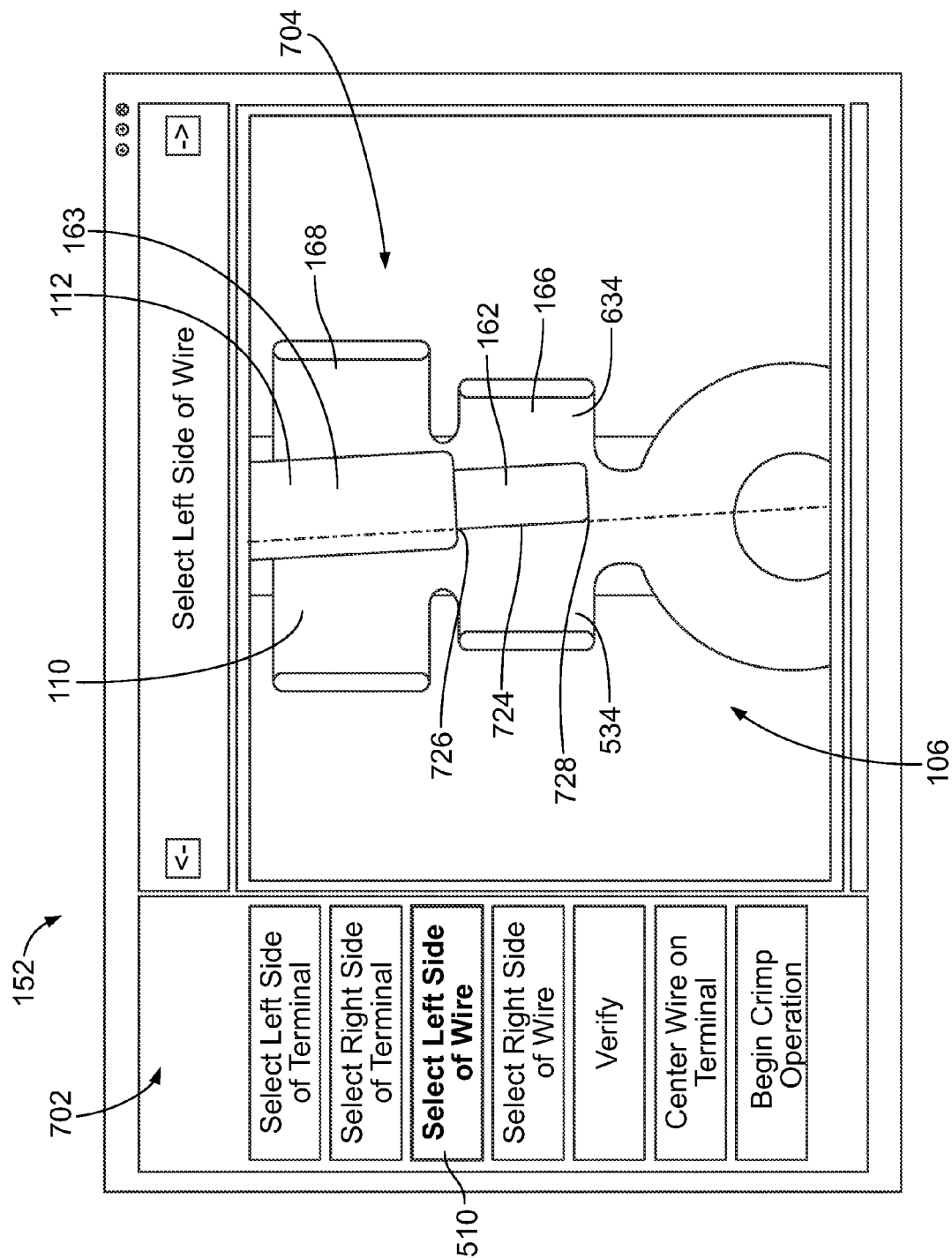
FIG. 7 shows a third screen shot displayed on the monitor according to an exemplary embodiment.

FIG. 7 shows a screen shot 702 on the monitor 152 that includes an image 704 depicting a wire 112 loaded onto the terminal 110 in the crimping zone 106. The image 704 was acquired by the image acquisition device 124 (shown in FIG. 2). The image 704 may be a second image that is acquired by the image acquisition device 124 subsequent to the images 504 and 604 (shown in FIGS. 5 and 6, respectively), which may be considered a first image or first images. Thus, the alignment lines 522, 622 (shown in FIG. 6) may already be set and stored in the memory 410 (shown in FIG. 4) prior to display of the image 704. Although the lines 522, 622 are not displayed on the image 704 in FIG. 7, the lines 522, 622 may be superimposed on the image 704 in other embodiments.

The wire 112 includes a wire end portion 162 that extends along the wire crimp barrel 166 of the terminal 110. The wire end portion 162 protrudes from a sheath or insulation 163, and at least a distal end of the insulation 163 extends along the insulation support barrel 168 of the terminal 110. The position and orientation of the wire 112 shown in image 704 may represent a wire feed position, which is the position and orientation of the wire 112 after being fed to the crimping zone 106 by the wire feeder device 160 (shown in FIG. 1) or manually by an operator. During the crimping operation, the ends (for example, wings 534, 634) of the wire crimp barrel 166 are folded over the wire end portion 162 by the crimp tooling 108 (shown in FIG. 2). Optionally, in the same or a different crimping operation, the ends of the insulation support barrel 168 are folded over the insulation 163 of the wire 112 by crimp tooling to mechanically fasten the wire 112 to the terminal 110 and provide stress-relief to the crimp between the wire end portion 162 and the wire crimp barrel 166. The position and orientation of the wire 112 relative to the terminal 110 prior to the crimping operation is important because a misaligned wire 112 could result in a low-quality lead that does not meet the crimp standards and specifications.

In screen shot 702, the "Select Left Side of Wire" button 510 is highlighted, and an alignment line 722 is displayed on the image 704. The alignment line 722 optionally may be distinguishable in appearance from the alignment lines 522 and 622 to represent that the line 722 is associated with the wire 112 and not the terminal 110. For example, the line 722 may be a dotted line, a solid line, or a dashed line having a different pattern or style than the lines 522 and 622 (shown in FIG. 6). In addition, the line 722 may have a different color than lines 522 and 622. In an exemplary embodiment, the alignment line 722 is manipulated to line up with a left edge 724 of the wire end portion 162. The alignment line 722 may be positioned by the operator using the same or a similar device as described to position alignment lines 522 and 622, such as the keyboard/mouse 414, touch screen 412, or external device 416 (all shown in FIG. 4). In addition, the alignment line 722 may be positioned by the operator dragging the line 722 into alignment with the left edge 724 or by the operator selecting multiple points along the left edge 724, such as a rear or proximal end 726 and a front or distal end 728 of the wire end portion 162. The rear end 726 is located at the interface between the insulation 163 and the end portion 162, where the insulation 163 has been cut to expose the end portion 162. The front end 728 is located at the distal tip of the wire 112 along the left edge 724.

Figure 8:
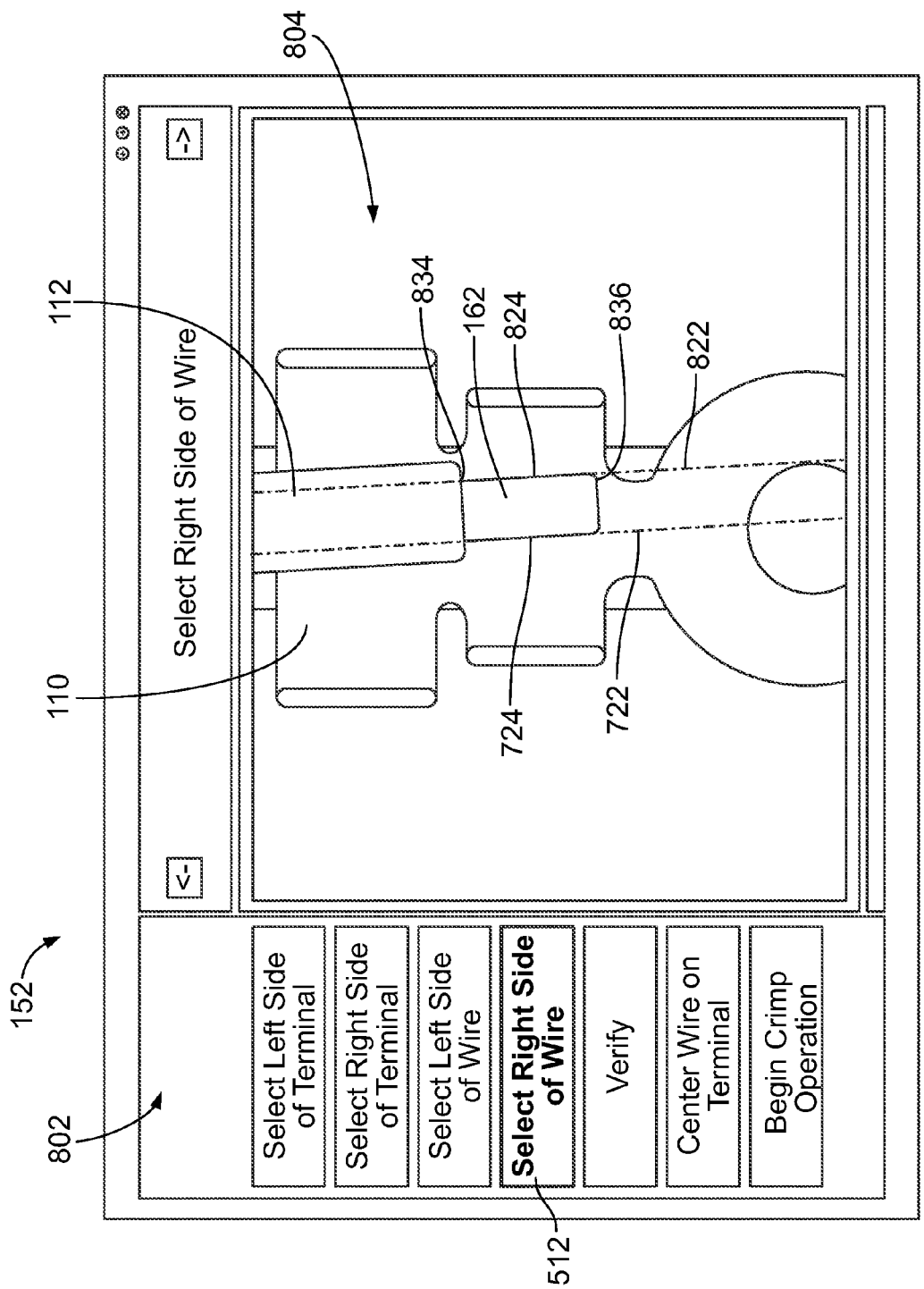
FIG. 8 shows a fourth screen shot displayed on the monitor according to an exemplary embodiment.

FIG. 8 shows a screen shot 802 on the monitor 152 that includes an image 804 depicting the wire 112 loaded onto the terminal 110. The image 804 may be the same image as image 704 (shown in FIG. 7) or another image taken of the same wire 112 and terminal 110 that were shown in image 704. In screen shot 802, the "Select Right Side of Wire" button 512 is highlighted, and an alignment line 822 is displayed on the image 804. The alignment line 822 is manipulated to align with a right edge 824 of the wire end portion 162. The alignment line 822 may mirror the alignment line 722 that is aligned with the left edge 724 of the wire end portion 162. The line 822 may be aligned with the right edge 824 by selecting a rear end 834 of the right edge 824 and a front end 836 of the right edge 824. The alignment line 722 is displayed in addition to alignment line 822 in FIG. 8 to allow the operator to visually compare the positions of both lines 722 and 822 to support selecting a position of line 822 that mirrors the position of line 722. In other embodiments, however, the alignment line 722 need not be displayed. Once both the left alignment line 722 and the opposite right alignment line 822 are selected/positioned by the operator, the alignment module 426 (shown in FIG. 4) is configured to calculate the location of a centerline 908 (shown in FIG. 9) of the wire 112. The locations of the lines 722, 822 and centerline 908 may be stored in the memory 410 (shown in FIG. 4) of the display device 148 (shown in FIG. 4).

Figure 9:
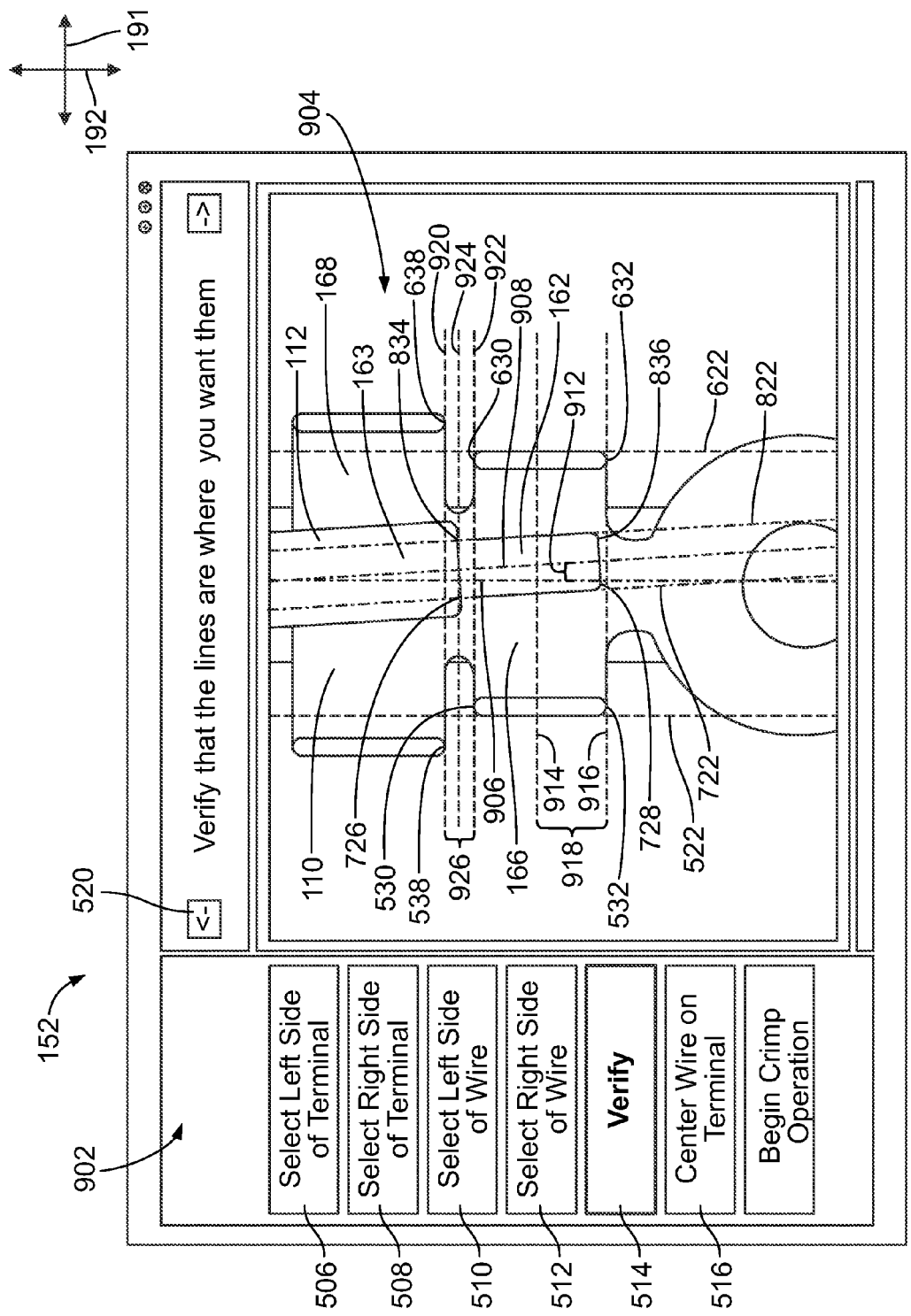
FIG. 9 shows a fifth screen shot displayed on the monitor according to an exemplary embodiment.

FIG. 9 shows a screen shot 902 of the monitor 152 that includes an image 904 depicting the wire 112 on the terminal 110. The image 904 may be the same image at least one of images 704 and 804 (shown in FIGS. 7 and 8, respectively). The alignment module 426 (shown in FIG. 4) is configured to superimpose the alignment lines 522, 622 of the terminal 110 and the alignment lines 722, 822 of the wire 112. In screen shot 902, the "Verify" button 514 is highlighted. The operator may verify whether the alignment lines 522, 622, 722, and 822 are where the operator wants them, meaning that the lines are each sufficiently aligned with the corresponding feature of the respective component. If not, the alignment module 426 may allow the operator to select one of the lines to manually move or re-position. Optionally, the operator may select a button on the user interface 156 to return to a previous alignment step, such as the left arrow button 520 to go back one step at a time or either of the buttons 506, 508, 510, or 512 to skip to a specific previous step. As shown in image 904, the alignment lines 522, 622, 722, and 822 have been accurately positioned, so the operator may verify that the lines are where the operator wants them.

In the illustrated embodiment, the alignment module 426 (shown in FIG. 4) may also display the calculated centerline 906 of the terminal 110 and the centerline 908 of the wire 112 on the displayed image 904. The centerlines 906 of the terminal 110 may be determined based on the positioning and slope of the respective alignment lines 522, 622, and the centerline 908 may be determined based on the positioning and slope of the respective alignment lines 722, 822. As shown in image 904, the centerline 906 of the terminal 110 is not aligned with the centerline 908 of the wire 112, although the alignment lines 522, 622, 722, and 822 are accurately set. More specifically, the centerline 906 is separated from the centerline 908 by a variable gap 912. The distance of the gap 912 varies because the centerlines 906, 908 are not commonly oriented, so the centerlines 906, 908 extend along different angles or slopes. In addition, the centerline 908 of the wire 112 is dispose to the right of the centerline 906 of the terminal 110, so to properly position the wire 112 relative to the terminal 110, the wire 112 must be moved to the left and also re-oriented to angularly align with the centerline 906 of the terminal 110. Since the centerlines 906, 908 are not aligned with each other, the wire 112 is not properly aligned relative to the terminal 110, and a lead produced from this alignment may possibly be discarded for not meeting the crimp specifications. To determine where to re-position the wire 112 relative to the terminal 110, the operator selects the "Center Wire on Terminal" button 516.

Optionally, as shown in FIG. 9, the alignment module 426 (shown in FIG. 4) may be configured to display one or more horizontal lines that extend across the wire crimp barrel 166 generally along the x axis 191. For example, the alignment module 426 may display a midline 914 that bisects the wire crimp barrel 166 between the front ends 532, 632 and rear ends 530, 630. The alignment module 426 also may superimpose an end line 916 that extends between the front ends 532, 632 of the wire crimp barrel 166. The positioning and slope of these lines 914, 916 may be determined based on the positions of the front ends 532, 632 and rear ends 530, 630 as selected by the operator or as determined using image analysis. The lines 914, 916 may define a region 918 where the distal end (for example, the ends 728, 836) of the wire end portion 162 should be located in the wire feed position to meet the crimp specification. For example, the crimp specifications may require that the distal end of the wire 112 extend beyond the midline 914 but not beyond the end line 916. Alternatively, the crimp specifications may require the end of the wire 112 to extend beyond the end line 916. Thus, the lines 914, 916 provide markers that extend transversely to the centerlines 906, 908 for determining the front-to-back positioning of the wire 112 relative to the terminal 110. It is noted that "front-to-back positioning" refers to movement along the y axis 192.

In an embodiment, the alignment module 426 (shown in FIG. 4) may superimpose a front end line 920 of the insulation support barrel 168 and a rear end line 922 of the wire crimp barrel 166. The positioning and slope of the front end line 920 may be determined based on the positions of the front ends 538, 638 of the insulation support barrel 168, as selected by the operator or as determined using image analysis. The positioning and slope of the rear end line 922 may be determined based on the positions of the rear ends 530, 630 of the wire crimp barrel 166, as selected by the operator or as determined using image analysis. The end lines 920, 922 define a region 926 therebetween where the edge of the insulation 163 of the wire 112 (for example, where the rear ends 726, 834, of the wire end portion 162) should be located to meet the crimp specifications. For example, the crimp specifications may require that the edge of the insulation 163, where the insulation 163 has been cut to expose the wire end portion 162, is in the region 926 between the lines 920 and 922 to ensure that the wire crimp barrel 166 only crimps to the wire end portion 162 and the insulation support barrel 168 only crimps to the insulation 163. The operator may then verify whether the edge of the insulation 163 is visible in the region 926 between the lines 920, 922 prior to crimping. Optionally, the alignment module 426 may also superimpose an insulation cut line 924, which has a position and slope determined based on the positions of the rear ends 726, 834 of the wire end portion 162, as selected by the operator or as determined using image analysis. By displaying the insulation cut line 924 (based on the wire 112) relative to the lines 920, 922 (based on the terminal 110), the operator is more easily able to verify whether the edge of the insulation 163 is within the region 926, and, more generally, whether the wire 112 is properly aligned front-to-back relative to the terminal 110. For example, the operator may align the wire 112 front-to-back relative to the terminal 110 such that the insulation cut line 924 is centered between the lines 920, 922.

Figure 10:
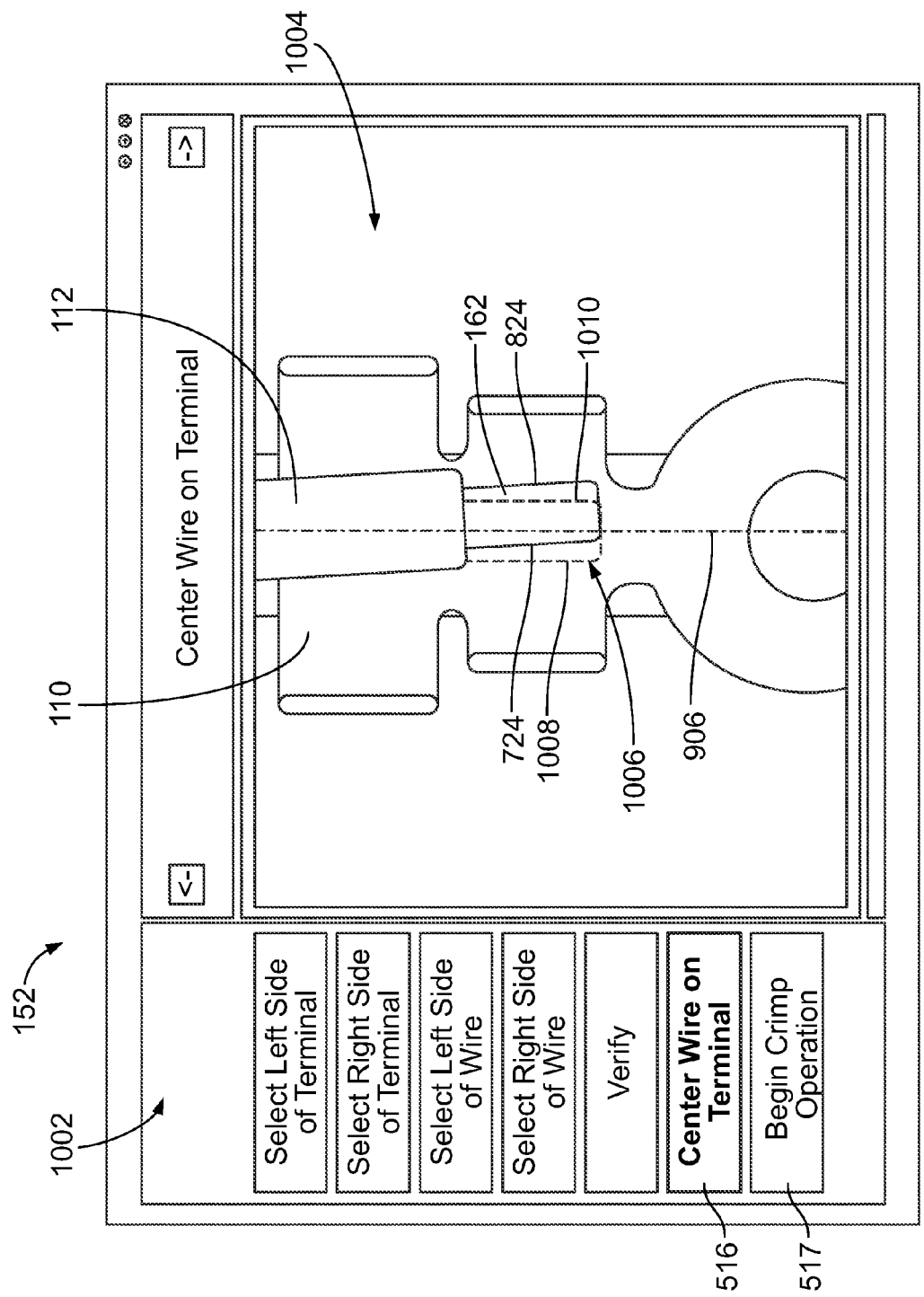
FIG. 10 shows a sixth screen shot displayed on the monitor according to an exemplary embodiment.

FIG. 10 shows a screen shot 1002 that includes an image 1004 depicting the wire 112 on the terminal 110. The image 1004 may be the same image as one or more of the images 704, 804, and 904, albeit with different superimposed lines. The "Center Wire on Terminal" button 516 is highlighted, which indicates that the alignment module 426 (shown in FIG. 4) has shifted one or more alignment lines of the wire 112 to align with one or more alignment lines of the terminal 110. More specifically, the alignment module 426 has reduced the gap 912 between the calculated centerlines 906 and 908 to zero (or a negligible distance) by shifting the edge lines 722 and 822 of the wire 112 to the left and along a different slope or angle. In an exemplary embodiment, the alignment module 426 has used the data points of the wire end portion 162 and the calculated centerline 906 of the terminal 110 to determine a target region 1006. The target region 1006 defines a region that is centered and aligned with the terminal 110, and the wire 112 should be adjusted such that the wire end portion 162 is disposed at least substantially within the region 1006. For example the target region 1006 is centered relative to the centerline 906 of the terminal 110, and the width of the target region 1006 is the determined width of the wire end portion 162. The target region 1006 has a left line 1008 and a right line 1010. The left edge 724 of the wire end portion 162 is configured to align with the left line 1008 and the right edge 824 of the wire end portion 162 is configured to align with the right line 1010.

As shown in FIG. 10, the wire 112 should be moved to the left (relative to the field of view captured in image 1004) and rotated in a clockwise direction in order for the wire end portion 162 to fall within the target region 1006. Depending on the relative position and orientation of the wire 112 and the terminal 110, one or both of the wire 112 and the terminal 110 may be moved relatively to the left or the right and/or rotated relatively in the clockwise or counterclockwise directions. A wire end portion 162 that is aligned with the target region 1006 may be considered to be properly aligned with the terminal 110 such that a crimping operation would result in a quality crimped lead that meets crimp specifications. Since the image 1004 may be magnified, the actual distances the wire 112 must be moved to align with the terminal 110 may be less than the distances appear on the screen shot 1002. Once the terminal 110 is properly aligned, the movable ram 144 (shown in FIG. 2) may be actuated to move along the crimp stroke such that the crimp tooling 108 (shown in FIG. 2) crimps the aligned terminal 110 to the wire 112.

Optionally, the alignment module 426 (shown in FIG. 4) of the display device 148 (shown in FIG. 2) may be communicatively coupled to the crimping machine 101 (shown in FIG. 2). For example, the alignment module 426 may transmit a message to the crimping machine 101 that indicates that the wire 112 and terminal 110 are properly aligned, and the crimping machine 101 may actuate the ram 144 (shown in FIG. 2) to begin the crimp stroke. The alignment module 426 may not send the message until the alignment module 426 receives verification from the operator that the wire 112 and terminal 110 are aligned relative to each other. The verification may be in the form of completing the alignment process described above, or by selecting a button that indicates completion of the alignment process, such as the "Begin Crimp Operation" button 517. The alignment module 426 may also be communicatively coupled to the wire feeder device 160 (shown in FIG. 1) and/or the terminal feeder device 104 (shown in FIG. 2) such that the alignment module 426 may automatically communicate feed adjustments to one or more of the devices 160, 104 based on the relative positions and/or orientations of the wire 112 and terminal 110 in the images acquired by the image acquisition device 124 (shown in FIG. 2).

Optionally, the wire 112 may be repositioned by making a wire feed adjustment in the feeder device 160 (shown in FIG. 1) to alter the wire feed position of the wire 112 in the crimping zone 106 (shown in FIG. 2). The feeder device 160 may be adjusted such that the device 160 feeds each segment of wire 112 to a feed position that is centered relative to the corresponding terminal 110 in the crimping zone 106. More specifically, the feeder device 160 may be adjusted such that each segment of the wire 112 is fed to the crimping zone 106 in a feed position where the end portion 162 of the wire 112 aligns with the target region 1006. As such, the centerline 908 (shown in FIG. 9) of each segment of wire 112 would align with the centerline 906 of each corresponding terminal 110 without having to reposition each segment of wire 112 for every crimping operation. Thus, the alignment process described and shown in FIG. 5-10 may be performed only during a setup procedure of the crimping machine 101 (shown in FIG. 2) or until the crimping machine 101 becomes misaligned and produces one or more poor quality leads. For example, the image acquisition device 124 (shown in FIG. 2) may continue to acquire images or video of the crimping zone 106 and the images and/or video may be displayed on the display device 148 for an operator to view the operation, without repeating each alignment step for each crimped lead. In an alternative embodiment, the alignment process may be repeated for each crimped lead.

In an embodiment, the field of view of the image acquisition device 124 may be calibrated. The field of view may be calibrated by first entering a measured dimension of a component in the field of view into the alignment module 426 (shown in FIG. 4). For example, an operator may input a known width of the wire crimp barrel 166 (shown in FIG. 9) of the terminal 110 into the display device 148 (shown in FIG. 2). By comparing the known width of the wire crimp barrel 166 with the calculated width of the wire crimp barrel 166 in an image acquired by the image acquisition device 124, a calibration variable may be derived. Thereafter, distances in the images displayed on the display device 148 may be multiplied by the calibration variable to determine actual distances. For example, the distance and angle of the gap 912 (shown in FIG. 9) may be quantified using the calibration to determine the exact distance and direction the wire 112 should be translated and the exact angle the wire 112 should be rotated to align with the target region 1006. The alignment module 426 may then communicate this positional and rotational information to the operator for manual adjustment or to the feeder device 160 for automatic adjustment. Optionally, a crimping system 100 (shown in FIG. 1) that employs an automatic wire feeder device 160 and has an alignment module 426 (shown in FIG. 4) that is calibrated and uses image analysis to determine the delta between the current alignment of the wire 112 and the desired alignment of the wire 112 may be operated automatically without any required intervention of an operator. Thus, the alignment module 426 may communicate the necessary adjustments of the wire feed position to the feeder device 160, and a controller of the feeder device 160 makes the adjustments.

In an alternative alignment process, after selecting the left and right sides of the terminal 110 as shown in FIGS. 5 and 6, the alignment module 426 (shown in FIG. 4) may be configured to superimpose a general target region (not shown) on an image of the wire 112 on the terminal 110 without going through the additional steps of selecting the left and right sides of the wire 112 as shown in FIGS. 7 and 8. For example, the general target region may demarcate the centerline 906 (shown in FIG. 9) of the terminal 110 (which is determined based on the left and right sides of the terminal 110). Optionally, the general target region may also mark one or more horizontal lines, such as the midline 914 (shown in FIG. 9) that bisects the wire crimp barrel 166 (FIG. 9). By providing alignment lines of the terminal 110, such as the centerline 906 and/or the midline 914, an operator may be able to visually determine how the wire 112 is aligned relative to the terminal 110 and use this information to make manual adjustments to the feed position of the wire 112 to better align the wire 112 with the terminal 110.

The alignment process described and shown above with respect to FIGS. 5-10 may be used to align segments of wire with corresponding terminals prior to crimping operations. With reference to FIG. 2, it is noted that the alignment of the terminal 110 relative to the crimp tooling 108 and the anvil 118 of the applicator 102 also affects the quality of the lead that is produced. A similar alignment process may be used to align the terminal 110 relative to the anvil 118 in the crimping zone 106 prior to loading the wire 112 onto the terminal 110. For example, the positioning and alignment of the terminal 110 may be determined during this prior terminal alignment process, and the positioning and alignment data may be stored in the memory 410 (shown in FIG. 4). During the subsequent wire alignment process, the information regarding the left and right side of the terminal 110 may be recalled from the memory 410. As such, if the terminal 110 position is already known, the wire alignment process described above may skip the steps shown in FIGS. 5 and 6 and start with selecting the left and right sides of the wire 112, shown in FIGS. 7 and 8.

With continued reference to FIG. 2, in an alternative embodiment, the image acquisition device 124 (shown in FIG. 2) may be moved from a mounted position above the crimping zone 106 to a position that is aligned height-wise with the terminal 110 and wire 112 in the crimping zone 106 along the z axis 193. By positioning the image acquisition device 124 along generally the same plane (defined by the x and y axes 191, 192, respectively) as the terminal 110 and wire 112, the image acquisition device 124 may acquire images and/or videos of the relative height of the wire 112 relative to the terminal 110. These images and/or videos may be displayed on the display device 148. The alignment module 426 may be configured to superimpose alignment lines of the wire 112 and terminal 110, similarly to the alignment process described above, in order to properly align the wire 112 along the z axis 193. Thus, the wire 112 may be imaged and aligned with the terminal 110 along each of the three axes 191, 192, and 193 to provide a quality crimped lead. In an alternative embodiment, a second image acquisition module (not shown) may be used to acquire images from this angle instead of moving and remounting the image acquisition device 124.

Figure 11:
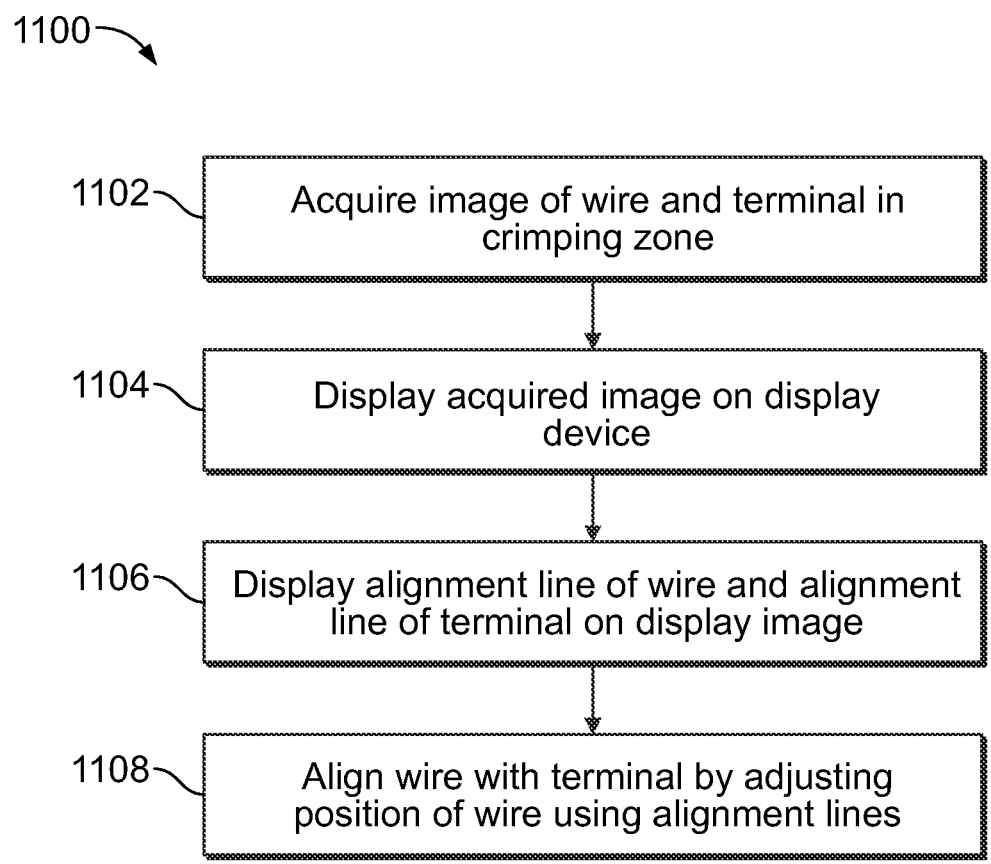
FIG. 11 is a flow diagram of a method of aligning a wire relative to a terminal within a terminal crimping machine according to an exemplary embodiment.

FIG. 11 is a flow diagram of a method 1100 of aligning a wire relative to a terminal within a terminal crimping machine. The terminal crimping machine may be terminal crimping machine 101 shown in FIG. 1. The method 1100 may be performed using the components of the terminal crimping system 100 shown in FIG. 1. At 1102, an image acquisition device is positioned to acquire at least one image of a crimping zone. The image includes a terminal and/or a wire. In an exemplary embodiment, the image acquisition device is positioned above the terminal and the wire in the crimping zone and positioned downwards to acquire top-down images of the crimping zone. At 1104, the acquired image or images are displayed on a display device. The image acquisition device may have a macro capability, such that the at least one acquired image is magnified when displayed on the display device.

At 1106, an alignment line of the wire and an alignment line of the terminal are superimposed on one displayed image. In an exemplary embodiment, the alignment line of the wire is a centerline of the wire, and the alignment line of the terminal is a centerline of the terminal. The centerline of the wire may be calculated based on operator-selected first and opposite second edges of the wire in the at least one displayed image. The centerline of the terminal may be calculated based on operator-selected first and opposite second edges of the terminal in the at least one displayed image. Alternatively, the centerline of the wire and/or terminal may be calculated automatically using an image analysis. For example, an alignment module of the display device or another processing device may electronically identify the first and opposite second edges of the respective wire and/or terminal in the image.

At 1108, the wire is aligned with the terminal by adjusting the position of the wire to align the alignment line of the wire with the alignment line of the terminal. The method may further include calibrating a field of view of the image acquisition device. The field of view may be calibrated by entering a measured dimension into the alignment module. After calibrating, the difference in position between the alignment line of the wire and the alignment line of the terminal in the displayed image may be represented by a quantified value. The feed position of a feeder device that feeds the wire to the crimping zone may be automatically adjusted based on the quantified value. After the wire is aligned with the terminal at step 1108, the method 1100 optionally may include actuating a movable ram of the crimping machine to move along a crimp stroke such that crimp tooling on the ram crimps the terminal to the wire.

Although as described in operation 1108, the position of the wire is adjusted to align with the terminal, it is recognized that in other embodiments, the position and/or orientation of the terminal may be adjusted based on the position of the wire. For example, the position of the terminal may be adjusted based on the alignment line of the wire, such that the alignment line of the terminal aligns with the alignment line of the wire prior to crimping the wire crimp barrel of the terminal to the end portion of the wire.

In an embodiment, the image acquisition device acquires a first image of the terminal in the crimping zone. The first image is displayed on the display device. A first and an opposite second edge of the terminal in the displayed first image are selected. A centerline of the terminal may be calculated based on the selected first and second edges, and the centerline may be shown on the first image. Next, a wire may be loaded onto the terminal in the crimping zone. A second image of the crimping zone, including the wire therein, is then acquired using the image acquisition device. The second image is then displayed on the display device. First and opposite second edges of the wire may be selected in the displayed second image. The centerline of the wire may be calculated based on the selected first and second edges, and both the centerline of the wire and the centerline of the terminal are shown on the second image. Alternatively, both centerlines may be shown on a subsequent third image. Next, the location of the centerline of the wire is compared to the location of the centerline of the terminal. The position of the wire in the crimping zone is adjusted, if necessary, to align the centerline of the wire with the centerline of the terminal. Optionally, the centerline of the wire may be re-calculated after adjusting the position of the wire, and the new centerline is shown on a third image along with the centerline of the terminal to determine whether the wire is now properly aligned with the terminal or if further adjustment is necessary.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A terminal crimping system for a crimping machine comprising:
   an anvil located in a crimping zone and configured to receive a terminal thereon, the terminal having a wire crimp barrel configured to receive an end portion of a wire therein,
   a movable ram having crimp tooling configured to crimp the wire crimp barrel of the terminal to the end portion of the wire during a crimp stroke of the ram,
   an image acquisition device configured to be mounted on the crimping machine above the crimping zone, the image acquisition device positioned to acquire an image of the wire within the terminal in the crimping zone, and
   a display device configured to display the image, wherein the image acquisition device has a macro capability and the image displayed on the display device is magnified.

2. The terminal crimping system of claim 1, wherein the image acquisition device is positioned above the anvil at least proximate to a crimping axis that extends through the anvil and the crimp tooling.

3. The terminal crimping system of claim 1, wherein the image acquired by the image acquisition device depicts a side-to-side alignment of the wire along a lateral axis relative to the terminal and a front-to-back alignment of the wire along a longitudinal axis relative to the terminal.

4. The terminal crimping system of claim 3, wherein the image acquisition device is a first image acquisition device and the terminal crimping system further comprises a second image acquisition device that is configured to be mounted on the crimping machine and generally aligned along a plane defined by the lateral axis and the longitudinal axis, the second image acquisition device positioned to acquire an image of the wire within the terminal in the crimping zone that depicts a height of the wire along an elevation axis relative to the terminal.

5. The terminal crimping system of claim 1, wherein the image acquisition device includes a mounting fixture that includes one or more magnets for magnetic attachment to the crimping machine.

6. The terminal crimping system of claim 1, wherein the display device includes a user interface configured to receive operator inputs selecting edges of at least one of the terminal or the wire.

7. The terminal crimping system of claim 1, further comprising an alignment module that is configured to receive verification from an operator that the end portion of the wire is aligned with the wire crimp barrel of the terminal and that an insulation layer of the wire is aligned with an insulation support barrel of the terminal prior to the ram moving along the crimp stroke.

8. A terminal crimping system comprising:
   an image acquisition device configured to be mounted on a crimping machine including an anvil located in a crimping zone and configured to receive a terminal thereon, the crimping machine further including a movable ram having crimp tooling configured to crimp the terminal to a wire received in the terminal, the image acquisition device mounted above the crimping zone and positioned to acquire an image of the wire within the terminal in the crimping zone,
   a display device configured to display the image, and
   an alignment module configured to superimpose an alignment line of the wire on the image that is displayed to allow the terminal to be aligned with the wire by adjusting at least one of a position or an orientation of the terminal to align the terminal relative to the alignment line of the wire prior to crimping the terminal to the wire.

9. The terminal crimping system of claim 8, wherein the alignment line of the wire extends at least partially through the wire in the image that is displayed.

10. The terminal crimping system of claim 8, wherein the image acquisition device has a macro capability and the image displayed on the display device is magnified.

11. The terminal crimping system of claim 8, wherein the image acquisition device is a first image acquisition device and the terminal crimping system further comprises a second image acquisition device configured to be mounted on the crimping machine, the image acquired by the image acquisition device depicting a side-to-side alignment of the wire along a lateral axis relative to the terminal and a front-to-back alignment of the wire along a longitudinal axis relative to the terminal, the second image acquisition device positioned to acquire an image of the wire within the terminal in the crimping zone that depicts a height of the wire along an elevation axis relative to the terminal.

12. The terminal crimping system of claim 8, wherein the image acquisition device includes a mounting fixture that includes one or more magnets for magnetic attachment to the crimping machine.

13. The terminal crimping system of claim 8, wherein the alignment module is further configured to superimpose an alignment line of the terminal on the image that is displayed, wherein the terminal is aligned with the wire by adjusting at least one of the position or the orientation of the terminal such that the alignment line of the terminal aligns with the alignment line of the wire.

14. A terminal crimping system comprising:
an image acquisition device configured to be mounted on a crimping machine including an anvil located in a crimping zone and configured to receive a terminal thereon, the crimping machine further including a movable ram having crimp tooling configured to crimp the terminal to a wire received in the terminal, the image acquisition device mounted above the crimping zone and positioned to acquire an image of the wire within the terminal in the crimping zone,
a display device configured to display the image, and
an alignment module configured to superimpose an alignment line of the terminal on the image that is displayed to allow the wire to be aligned with the terminal by adjusting at least one of a position or an orientation of the wire to align the wire relative to the alignment line of the terminal prior to crimping the terminal to the wire.

15. The terminal crimping system of claim 14, wherein the alignment module is configured to calibrate a field of view of the image acquisition device such that at least one of a distance or angle between the wire and the alignment line of the terminal in the image that is displayed is represented by a quantified value.

16. The terminal crimping system of claim 15, wherein the alignment module automatically communicates a feed adjustment to a feeder device based on the quantified value, the feeder device configured to automatically adjust a feed position of the wire and repetitively feed individual segments of the wire to the feed position relative to a corresponding terminal in the crimping zone for consecutive crimp strokes of the ram.

17. The terminal crimping system of claim 14, wherein the alignment line of the terminal comprises a centerline of the terminal that is calculated at least one of based on operator-selected left and right edges of a wire crimp barrel of the terminal in the image that is displayed or automatically by the alignment module using image analysis of the wire crimp barrel in the image.

18. The terminal crimping system of claim 14, wherein the alignment line of the terminal comprises a midline of a wire crimp barrel of the terminal that is calculated at least one of based on operator-selected front and rear edges of the wire crimp barrel in the image that is displayed or calculated automatically by the alignment module using image analysis of the wire crimp barrel in the image.

19. The terminal crimping system of claim 14, wherein the alignment module is further configured to superimpose an alignment line of the wire on the image that is displayed, wherein the wire is aligned with the terminal by adjusting at least one of the position or the orientation of the wire such that the alignment line of the wire aligns with the alignment line of the terminal.

20. The terminal crimping system of claim 14, wherein the alignment module is further configured to superimpose a target region on the image that is displayed, the location of the target region based on the alignment line of the terminal, wherein the wire is aligned with the terminal by adjusting at least one of the position or the orientation of the wire such that the wire aligns with the target region.

21. The terminal crimping system of claim 14, wherein the image acquisition device is a first image acquisition device and the terminal crimping system further comprises a second image acquisition device configured to be mounted on the crimping machine, the image acquired by the image acquisition device depicting a side-to-side alignment of the wire along a lateral axis relative to the terminal and a front-to-back alignment of the wire along a longitudinal axis relative to the terminal, the second image acquisition device positioned to acquire an image of the wire within the terminal in the crimping zone that depicts a height of the wire along an elevation axis relative to the terminal.

* * * * *